No Printed Specification Available
H. Johnson,
8848X
Thrashing Mach.
Patented May 29. 1835.
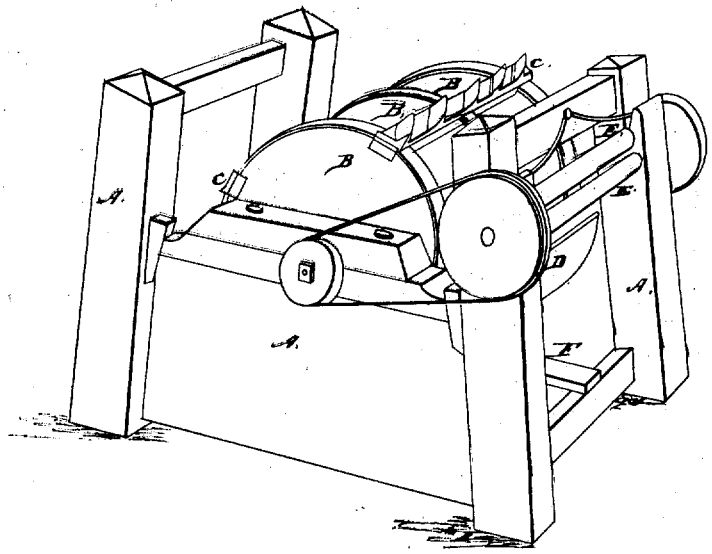
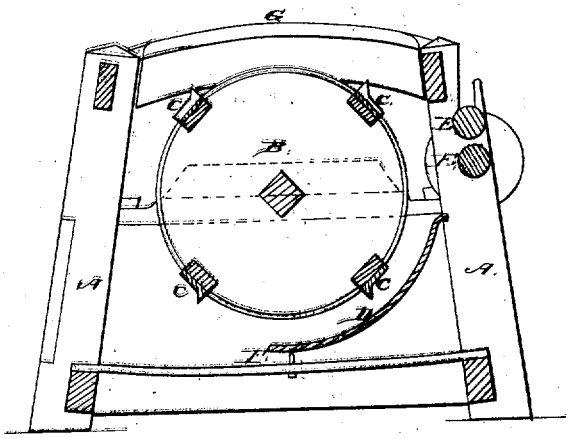

5/27/1835 0840X av. 12
May. 29. 1835 33.

Henry Johnson, Washington Co. Ten.

Letters Patent.

The Schedule referred to in these Letters Patent and making part of the same, containing a description in the words of the said Henry Johnson himself of his improvement in the Thrashing Machine.

To all to whom these presents shall come greeting Be it known that I Henry Johnston of Washington County State of Tennessee have invented a new and useful Thrashing Machine, & that the following is a full and exact description thereof to wit; that part which is entirely new & of his own discovery. a cylinder three feet one inch in length, 14 inches diameter, iron axle, upon which are three wooden pullies iron banded|bars. of wood in bars two inches & quarter wide and inch and half thick banded with the pullies and upon which is a cast plate half inch thick. as wide as the wooden bars, with transverse cogs or breaks thereon, inch in thickness and transversely crossing the plate of two and a half inches in width under which is placed a breast of same length of wheel (or, cilender, said breast one quarter of the width of the circumference of the wheel hung on elastic hinges or steel springs, so as to recede from the cilinder in case of overcharge of grain, or other thing & to return to its position when the same is removed. What I claim as my own, is the form. mode. & manner of making putting on & operating of the cogs or thrashers on the cilender and the elastic apron underneath said wheel or cilender Witnesses Henry Johnson George Crouch George W. Hoss Exd Ch.J.W.

312 [illegible]

(Patented May 29th 1835.)